(12) United States Patent
Foo

(10) Patent No.: US 8,837,749 B2
(45) Date of Patent: Sep. 16, 2014

(54) MANAGING THE EFFECT OF TDMA NOISE ON AUDIO CIRCUITS

(75) Inventor: Edwin W. Foo, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 715 days.

(21) Appl. No.: 13/044,401

(22) Filed: Mar. 9, 2011

(65) Prior Publication Data

US 2012/0230505 A1 Sep. 13, 2012

(51) Int. Cl.
*H04B 15/00* (2006.01)
*G10K 11/16* (2006.01)
*H04B 15/02* (2006.01)

(52) U.S. Cl.
CPC ....................................... *H04B 15/02* (2013.01)
USPC ....... 381/94.1; 381/71.1; 381/71.8; 381/94.2; 455/63.1; 455/114.2

(58) Field of Classification Search
CPC ............ G10K 11/1788; G10K 11/178; G10K 11/1784; G10K 2210/3045; G10L 21/0208; H04R 3/005; H04R 25/505; H04R 25/70; H04R 25/453; H04R 25/502; H04R 25/356; H03G 5/18; H04W 16/14; H04W 28/04; H04B 1/0475; H04B 1/525
USPC ............. 381/71.1, 71.8, 94.1, 94.2, 312, 318, 381/321; 455/63.1, 114.2
See application file for complete search history.

(56) References Cited

U.S. PATENT DOCUMENTS

| 6,009,311 | A | 12/1999 | Killion et al. |
| 6,122,500 | A | 9/2000 | Dent et al. |
| 6,763,116 | B2 | 7/2004 | Barthel et al. |
| 6,865,276 | B1 * | 3/2005 | Ljungberg et al. ........... 381/94.1 |
| 7,529,378 | B2 | 5/2009 | Roeck et al. |
| 7,634,098 | B2 | 12/2009 | Townsend et al. |
| 7,773,943 | B2 | 8/2010 | Zurek et al. |
| 2010/0120382 | A1 | 5/2010 | Prather et al. |

FOREIGN PATENT DOCUMENTS

EP 1 501 200 11/2004

* cited by examiner

*Primary Examiner* — Paul Kim
(74) *Attorney, Agent, or Firm* — Womble Carlyle Sandridge & Rice LLP

(57) ABSTRACT

Broadly speaking, the embodiments disclosed herein describe an apparatus, system, and method for managing the effects of TDMA noise emitted by a communication device on an audio circuit.

23 Claims, 14 Drawing Sheets

MANAGING THE EFFECT OF TDMA NOISE ON AUDIO CIRCUITS

FIELD OF THE DESCRIBED EMBODIMENTS

The described embodiments relate to managing the adverse effect of TDMA noise on the performance of an audio circuit.

DESCRIPTION OF THE RELATED ART

The term "noise" is often and loosely used to describe unwanted electrical signals that distort the purity of the desired signal. Some forms of noise are unavoidable (e.g., real fluctuations in the quantity being measured), and can be overcome only with the techniques of signal averaging and bandwidth narrowing. Other forms of noise, such as TDMA noise, can be related to radio frequency (RF) interference. TDMA noise (also referred to as TDMA "buzz") takes the form of RF energy emitted by mobile communication devices that rely upon TDMA channel access protocols to establish a communication channel between the mobile communication device and a communication network.

When the RF energy associated with TDMA noise electromagnetically couples with an audio circuit driving an audio output device (such as a speaker), an audible sound (likened to the staccato sounds of the Morse Code) can be produced. The audible sound generated by the coupling of TDMA noise and the audio circuit is due to the fact that a substantial portion of the energy of the full spectrum of TDMA noise is associated with a single frequency component corresponding to the clearly audible 218 Hz TDMA pulse-repetition rate (with lesser amounts of energy being associated with the lower harmonics) which is clearly within the range of normal human hearing.

Since TDMA noise is due to an inherent characteristic of any TDMA based communication scheme, it can be difficult and quite expensive to eliminate TDMA noise (such as using isolating capacitors) at the originating mobile communication device. This is particularly true as the mobile communication devices become smaller in size and more powerful.

Therefore, what is desired is a simple yet effective approach to manage the adverse effects of TDMA noise on the audio performance of an audio circuit as perceived by an end user.

SUMMARY

Broadly speaking, the embodiments disclosed herein describe techniques for managing the effects of TDMA noise emitted by a portable communication device. In particular, the described embodiments reduce or eliminate audible noise generated by an audio circuit susceptible to TDMA noise.

In one embodiment, a method performed by a TDMA based portable communication device is described. The method can be carried out by activating a TDMA noise management mode when a connection state between the portable communication device and a wireless network is determined to be connected. If a communication type between the portable communication device and the wireless network is determined to be a first communication type, then the TDMA noise management mode is suspended during a period of data inactivity.

In one aspect of the embodiment, the first communication type corresponds to a low data traffic pattern representing a low rate of data transfer between the portable communication device and the wireless network.

In another aspect of the described embodiment, the TDMA noise management mode is a frequency shifting type TDMA noise management mode that can be performed by receiving an original content signal at a frequency shifting module, frequency shifting a selected range of audio frequencies of the original content signal to form a frequency shifted content signal, and broadcasting the frequency shifted content signal. In this way, any audible content received at an audio device within the selected range of audio frequencies is processed as TDMA noise and not original content.

In another embodiment, a portable communication device is described. The portable communication device includes at least a TDMA based RF circuit that generates a RF based TDMA noise signal during an active call, a TDMA noise modification signal generator in communication with the TDMA based RF circuit arranged to generate a TDMA noise modification signal only during the active call, and an RF antenna coupled to the TDMA based RF circuit arranged to broadcast the TDMA noise modification signal only during the active call. In the described embodiment, the TDMA noise modification signal is associated with the RF based TDMA noise signal and is arranged to reduce an electromagnetic coupling between the RF based TDMA noise signal emitted by the portable communication device and an audio circuit.

In yet another embodiment, non-transitory computer readable medium performed by a processor in a TDMA based personal communication device is described. The non-transitory computer readable medium includes at least computer code for determining a connection state of the portable communication device in relation to a wireless network, computer code for activating a TDMA noise management mode when the connection state is determined to be connected, computer code for characterizing a data traffic pattern of data transfer when the portable communication device is connected to the network, and computer code for suspending the TDMA noise management mode during a period of data inactivity when the data traffic pattern is determined to be a low data traffic pattern.

In still another embodiment, a method performed by a TDMA based portable communication device can be carried out by receiving an original content signal at a frequency shifting module, frequency shifting a selected range of audio frequencies of the original content signal to form a frequency shifted content signal, and broadcasting the frequency shifted content signal.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1A:
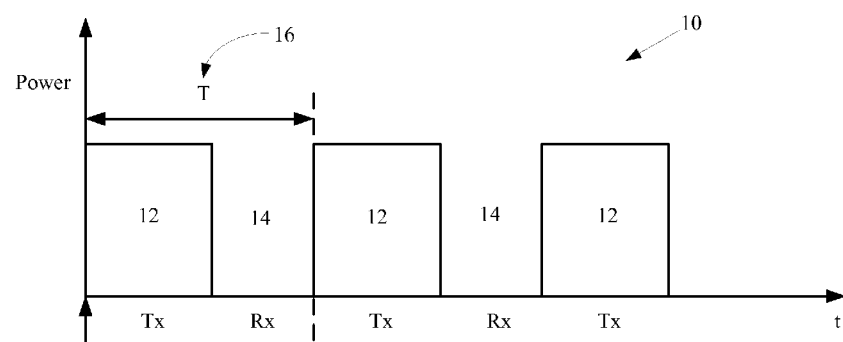
FIGS. 1A-1C show various aspects of noise generated by portable communication device that uses a TDMA scheme to communicate with a wireless network.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

The portable communication device described herein can be equipped to provide wireless communications using, for example, a cellular telephonic network. In a particular embodiment, the portable communication device (referred to hereinafter as PCD) utilizes the TDMA channel access scheme in order to communicate with an appropriate cellular network, or NW. In one embodiment, the PCD can take the form of a smartphone, such as the iPhone™ manufactured by Apple Inc. of Cupertino, Calif.

When the PCD is operating in active call mode or data mode (when a TDMA channel is active), the PCD can assist in managing the adverse effects of TDMA noise experienced by those audio circuits susceptible to TDMA noise. Such external circuits can include, for example, head phones, ear buds, hearing aids that use speakers, and so forth. In one embodiment, the PCD can proactively shift that portion of an audio signal having a frequency associated with TDMA noise to a range of frequencies not audible to a human. For example, an audio signal having a portion of its energy associated with a TDMA fundamental frequency (218 Hz) and any of a number of the associated harmonics, or overtones (436 Hz, 654 Hz, and so on) can have that portion(s) upshifted above about 20 k Hz. In this way, any audio circuit receiving the audio signal can presume that any portion of the received audio signal having a frequency in a range of TDMA noise signal (or overtones) is likely to be TDMA noise and not content or other useful information and can therefore be processed accordingly (such as being suppressed).

In another embodiment, when the PCD is in active call or data mode, the PCD can transmit a cancellation signal that can be used to cancel out the TDMA noise generated by the PCD. The cancellation signal can cancel the originating TDMA noise by, for example, using destructive interference that effectively cancels out the originating TDMA noise. In this way, those portions of the original audio signal received by the external audio circuit associated with TDMA noise can be effectively eliminated. In one embodiment, the cancellation signal can be an inverse of the signal associated with the TDMA noise. Since the amplitude of the TDMA noise is related to the difference in power levels between the transmit and receive intervals, the amplitude of the cancellation signal can also be varied in accordance with the power levels of the transmit and receive intervals. In this way, a more efficient and complete TDMA noise cancellation can be effectuated.

It should be noted, however, that the cancellation signal can also cancel out at least some of the original signal from the PCD causing a loss in some content or other valuable information. This loss in information may be perceived as gaps in music or other content that would otherwise go unnoticed if the original content was speech. Therefore, in some cases, the PCD can tag or otherwise identify those portions of the original signal as being associated with the cancellation signal. In this way, an appropriately configured audio circuit can recover at least some of the information or content from the PCD that would otherwise be lost due to the effects of the cancellation signal on the original signal from the PCD. For example, the PCD can (prior to broadcasting the original signal) upshift or downshift those portions of the original signal having a frequency (or frequencies) that correspond with TDMA noise. The external audio circuit can upon receiving the frequency shifted audio signal reconstitute the original information using a predetermined reconstitution procedure (such as frequency re-shifting).

In another embodiment, the PCD can broadcast a notification that the PCD has entered an active call or data mode. In this way, an appropriately configured external circuit can respond by altering its current operating state to one that can take into account the potential reception of TDMA noise. In one embodiment, the external circuit can replace a current equalizer (EQ) profile with a TDMA resistant EQ profile that can be used to suppress frequency components associated with TDMA noise. For example, the TDMA resistant EQ profile can include a notch filter(s) that can be used to suppress or eliminate audio frequency components associated with TDMA noise (e.g., 218 Hz, 436 Hz, and so on).

In still another embodiment, the application of any of the above described TDMA noise management modes can be modified by the connection state of the PCD. For example, when the PCD is not connected to the network (such as in IDLE mode), then the TDMA management mode can be suspended for so long as the PCD remains in the unconnected state. However, once the PCD requests a connection, the PCD can instantiate the appropriate TDMA management mode during the period of time that the PCD is connected to the network. In a further refinement, when the PCD is in the connected state, the PCD can determine a communication type and based upon the communication type, modify the application of the TDMA management mode accordingly. For example, a first communication type can correspond to a low rate of data transfer between the PCD and NW (referred to as a low data traffic pattern) whereas a second communication type can be associated with a high data transfer between the PCD and NW (referred to as a high data traffic pattern). In any case, both the connection state and the type of communication between the PCD and the NW can be used to decide whether or not to apply a particular TDMA noise management mode.

These and other embodiments are discussed below with reference to FIGS. 1-13. However, those skilled in the art will readily appreciate that the detailed description given herein with respect to these figures is for explanatory purposes as the invention extends beyond these limited embodiments.

Figure 1B:
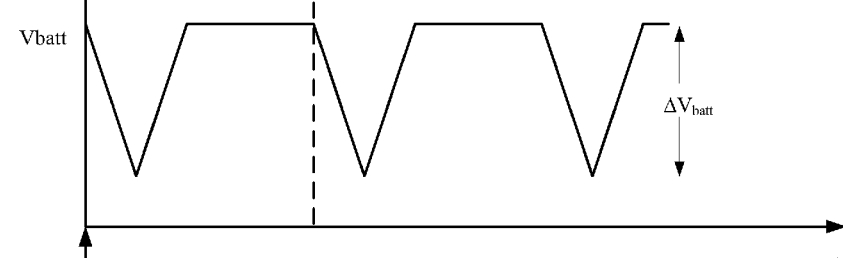
Figure 1C:
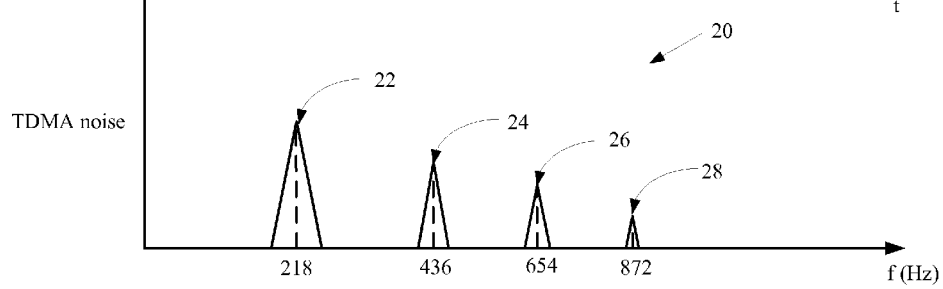

FIGS. 1A-1C show various aspects of noise generated by PCD that uses a TDMA scheme to communicate with a wireless network. FIG. 1A shows power profile 10 of power used in the PCD during a representative active call (either data or voice). During transmit interval Tx 12, PCD sends data to the base station for a preset period T, and receives data from the base station during receive interval Rx 14 of the preset period T (period T is about 4.6 ms). When using the TDMA scheme, the PCD generates RF signals divided into frames each of which is further divided into time slots 16 (typically 8 time slots). The duration of a time slot, which includes one transmit interval and one receive interval, is the period T of about 4.6 ms (which corresponds to a frequency of 218 Hz). As shown in FIG. 1A, the level of transmit power consumed for sending data in transmit interval Tx 12 in time slot 16 is higher than that of receive power consumed for receiving data in receive interval Rx 14 also of time slot 16. Electric current drawn by the high transmit power level results in a battery voltage drop $\Delta V_{batt}$ shown in FIG. 1B that cause the TDMA noise generated by the PCD.

FIG. 1C illustrates frequency components 20 of TDMA noise associated with periodic voltage drops depicted in FIG. 1B. In the PCD, TDMA noise having component frequencies of multiples of 218 Hz is generated whenever transmit power is applied to send data or open a voice channel. As shown in FIG. 1C, TDMA noise having component frequencies of 218 Hz, 436 Hz, 654 Hz and so on are generated. It should be noted, however, that the TDMA noise components have a frequency spread $\Delta f$ about a central frequency f that the amount of energy associated with a particular TDMA noise frequency component is related to central frequency f. For example, TDMA noise component 22 (also referred to as fundamental component) has central frequency f1 of about 218 Hz whereas first harmonic 24 has central frequency f2 of about twice that of fundamental component 22, or 436 Hz and so on. An amount of energy associated with fundamental component 22 is substantially greater than that associated with first harmonic 24 and so on for higher harmonics (second harmonic 26 and third harmonic 28, etc.). Therefore, since the greatest proportion of energy associated with the entire TDMA noise spectrum is coupled to the fundamental frequency component f1 which also happens to be well within the range of normal human hearing, the TDMA noise management mode discussed herein focuses eliminating or otherwise reducing the amount of RF energy associated with fundamental frequency component f1 that electromagnetically couples with an audio circuit.

Figure 2:
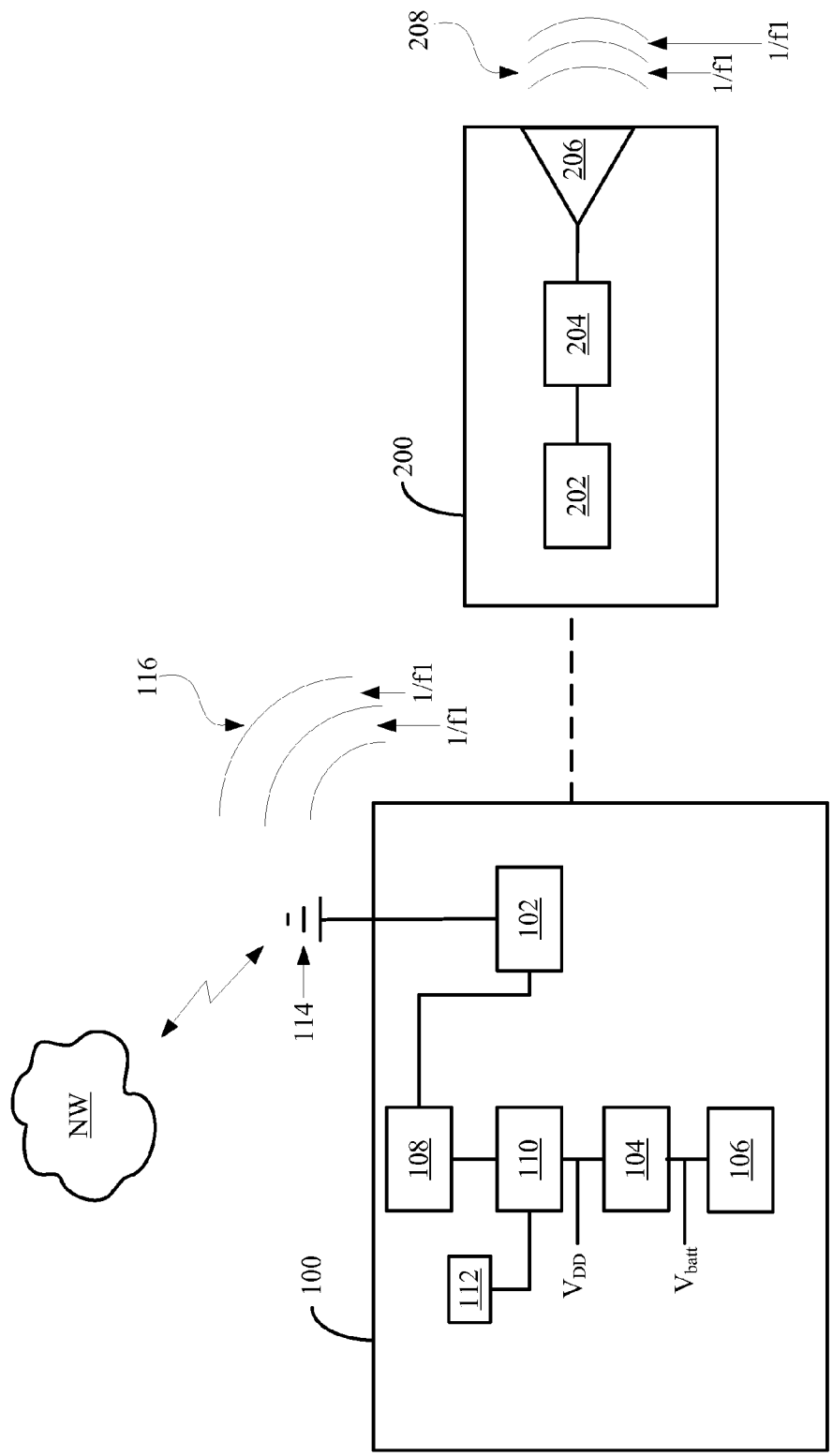
FIG. 2 shows representative block diagram of portable communication device and audio device.
Figure 3:
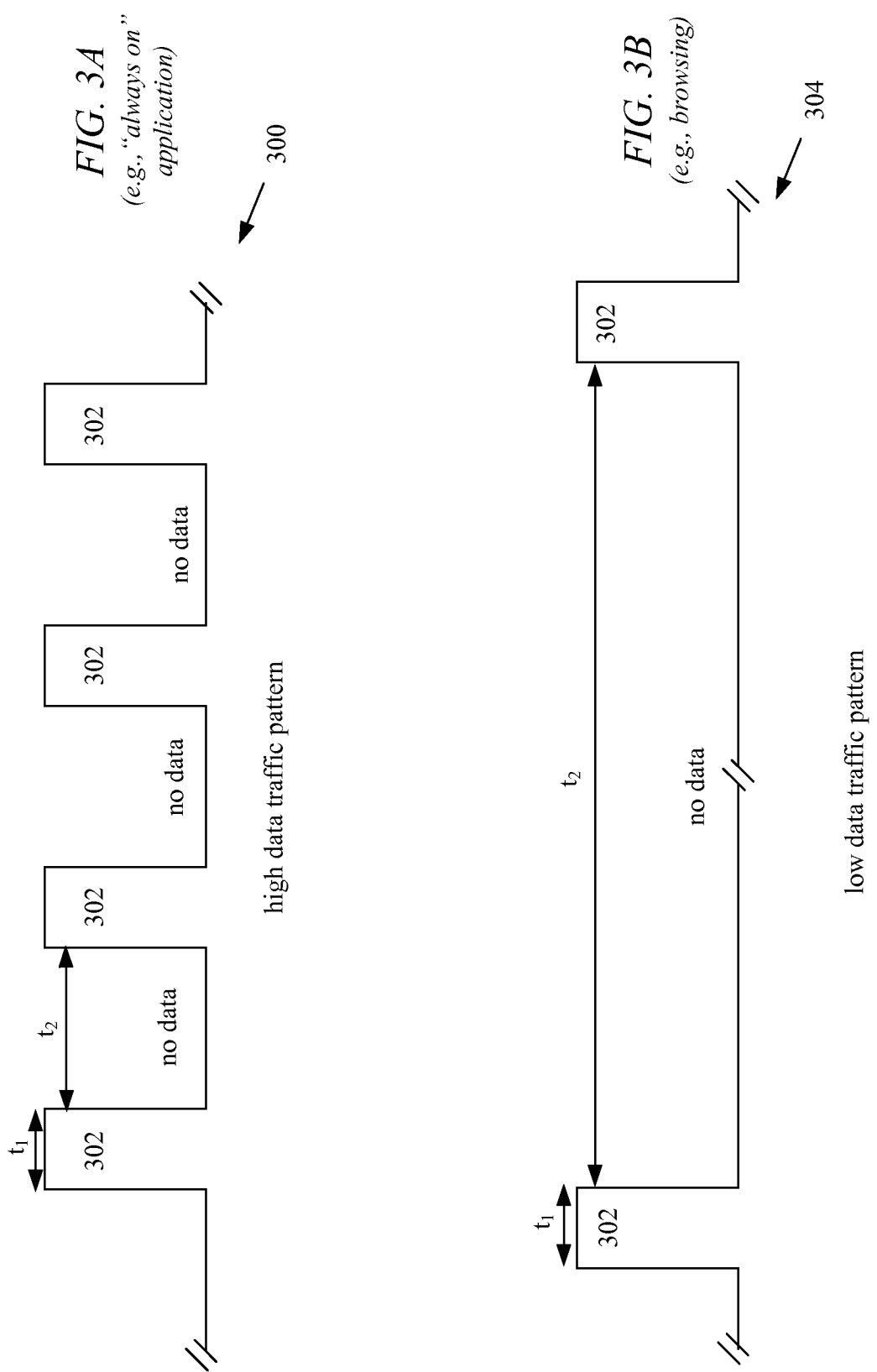
FIGS. 3A and 3B show representative data traffic patterns.

FIG. 2 shows representative block diagram of mobile portable communication device (PCD) 100 and audio device 200. Audio device 200 can be separate from but related to PCD 100 (such as head phone, ear buds). Audio device 200 and PCD 100 can communicate with each other in any number of ways. For example, when audio device 200 takes the form of a simple set of headphones, then the communication between audio device 200 and PCD 100 can be unidirectional in nature (i.e., information is passed from PCD 100 to audio device 200). On the other hand, when audio device 200 takes the form of a more sophisticated audio device, such as a hearing aid, or portable media player, or smartphone, and such, then the communication between PCD 100 and audio device 200 can be either unidirectional or bidirectional. Moreover, the communication between PCD 100 and audio device 200 can also vary depending upon a current operating state of either device.

In some cases, audio device 200 and PCD 100 can be a single device. For example, audio device 200 can take the form of a speaker or other acoustic transducer that can be incorporated into PCD 100. In other cases, however, PCD 100 and audio device 200 can be independent and unrelated to each other in which case there is no presumption that a communication channel between PCD 100 and audio device 200 can be established. For example, PCD 100 can represent a portable telecommunication device such as a cell phone whereas audio device 200 can represent a portable media player unrelated to the cell phone. In this situation, an end user can be listening to music on the portable media player at the same time as the cell phone is using an application to receive/transmit data from/to a wireless network requiring the establishment of an active TDMA based communication link. The establishment of the active TDMA based communication link with the network can cause the cell phone to generate TDMA noise having a fundamental central frequency of about 218 Hz (and higher harmonics) that clearly resides in the range of normal human hearing. The TDMA noise can interact with an audio circuit in the portable media player causing the portable media player to emit audible noise having a frequency of about 218 Hz. This can be particularly troublesome if audio device 200 is a hearing aid or other hearing device designed to aid individuals with impaired hearing.

In any case, PCD 100 can include radiofrequency (RF) circuit 102, power management unit (PMU) 104, battery 106, baseband circuit 108, processor 110 and audio amplification circuit 112. Battery 106 can provide battery voltage $V_{batt}$, and PMU 104 can provide voltage $V_{DD}$ from $V_{batt}$. RF circuit 102 can include an RF amplifier and a plurality of transceivers (not shown) that can send and receive radio signals via RF antenna 114 or the like. The RF amplifier can be used to amplify the RF signal and to provide any received amplified RF signals to baseband circuit 108. Baseband circuit 108 can be used to perform functions such as modulation, demodulation, encoding, and decoding. Further, baseband circuit 108 can include a demodulation circuit and a de-coding circuit, and the de-coding circuit may include a digital-to-analog converter (DAC) (not shown).

PCD 100 can be configured for communication using, for example GSM, or any other communication protocol that uses a TDMA channel based access scheme. When incoming radio waves are received, the signals are amplified and de-modulated by baseband circuit 108. The received radio waves may have a carrier frequency of about 850 MHz to about 1.9 GHz, but the de-modulated signal has a frequency of 218 Hz causing a significant voltage ripple resulting in TDMA noise with the fundamental component of 218 Hz. Whenever PCD 100 is connected to network NW, PCD 100 can emit RF energy in the form of TDMA noise 116 that can couple electro-magnetically with audio device 200 and more specifically with audio circuit 202. The coupling of TDMA noise 116 with audio circuit 202 can generate audible sound that can be amplified by audio amplifier 204 that drives output device 206 (such as a speaker). Speaker 206 can output audio noise 208 that is directly related to TDMA noise 116. The relationship between TDMA noise 116 and audible noise 208 is graphically represented in FIG. 2 by showing that TDMA noise 116 as a series of wave fronts separated from each other by a period of time T (=1/f1) as is audible noise 208. Audible noise 208 can be perceived by an end user as a staccato noise such as an annoying series of clicks not unlike those associated with Morse code.

PCD 100 can operate in two basic modes, low power "idle mode" otherwise referred to as "unconnected mode" and "connected mode" where the connectedness refers to the connection state between PCD 100 and network (NW). In the idle mode, there can be little or no significant messaging traffic between PCD 100 and network NW and therefore little likelihood of TDMA noise being generated. However, once PCD 100 requests a connection from network NW and a connection are established, the likelihood of PCD 100 generating copious amounts of TDMA noise 116 greatly increases due to the high probability of significant data and/or voice transmission (and associated messaging traffic) between PCD 100 and network NW. For example, in order to create the necessary connection between PCD 100 and network NW for sending/receiving data or voice packets, a significant amount of messaging traffic between PCD 100 and network NW is required. This messaging traffic itself can result in a substantial increase in TDMA noise 116 generated by PCD 100. However, once the connection between PCD 100 and network NW is established, a significant amount of TDMA noise 116 will only be generated when there is active data/voice/messaging traffic between PCD 100 and network (NW). In other words, the amount of TDMA noise 116 generated by PCD 100 will be in accordance with the data traffic pattern exhibited by PCD 100. By data traffic pattern it is meant the frequency and duration of active data intervals in comparison to the frequency and duration of inactive data intervals. A high data traffic pattern can be characterized as one in which the frequency and duration of active data intervals is greater than that associated with inactive data intervals. A low data traffic pattern can be just the opposite. Therefore, by taking into consideration both the connection state of PCD 100 (either connected or unconnected) and specific data traffic pattern (either high or low) of PCD 100 when connected to network NW, an adaptable TDMA noise management mode can be implemented.

More specifically, in one embodiment, a TDMA noise management mode can be activated when PCD 100 is connected and suspended when the PCD 100 is not connected. For example, when PCD 100 is in idle mode (i.e., unconnected state), then the TDMA noise management mode can be suspended. However, once PCD 100 generates a connection request, then the TDMA noise management mode can be activated. In this way, whether or not the TDMA noise management mode is active can be based upon a current connection state of PCD 100. Furthermore, even when PCD 100 is connected to network NW, the connection state can be further characterized by a data traffic pattern between PCD 100 and network NW. The data traffic pattern can be used to further modify the operation of the TDMA noise management mode. For example, when the data traffic pattern is high data traffic pattern (associated with an "always on" application, for example), then the TDMA management mode can be fully active. In this way, the effects of the expected high level of TDMA noise generated by the data/messaging traffic between PCD 100 and network NW on an audio circuit can be effectively managed. On the other hand, a low data traffic pattern such as that associated with browsing by an end user can result in a reduction in (or even suspension of) the activity of the TDMA noise management mode commensurate with the current data traffic pattern at PCD 100.

For example, FIGS. 3A-3B show various data traffic patterns consistent with high and low amounts of TDMA noise generated by PCD 100. In particular, FIG. 3A shows a representation of data traffic pattern 300 consistent with PCD 100 executing an application that can cause PCD 100 to operate in what is referred to as an always on mode (at least in the background). In the always on mode, short duration data 302 can be periodically transferred between PCD 100 and the network NW. Data 302 can, for example, originate at PCD 100 as current location data provided to a server computer by way of network NW. Data 302 can also originate from a server computer that can periodically push data (email updates, for example) to PCD 100. In any case, in order to adequately service the transfer of data 302, there must be a dedicated data channel between PCD 100 and network NW.

Therefore, the relationship between time $t_1$ and time $t_2$ can be used to define a data traffic pattern for PCD 100. In other words, if time $t_2$ is relatively short in duration (i.e., there is little time between data transfers), then PCD 100 can be said to be in a high data traffic pattern. In this way, it is likely that the TDMA management mode will be active for the entire time that PCD 100 is connected to network NW. On the other hand, when time $t_2$ is becomes longer in duration (as illustrated in FIG. 3B), then PCD 100 can be said to be in low data traffic pattern 304. In this case, the duration of time that PCD 100 spends in a no data transfer mode (even though in a connected state) is substantially longer that the duration of time that PCD 100 is in an active data mode. In this situation, therefore, the TDMA management mode can be suspended (or even de-activated) for at least the duration of time $t_2$. In some cases, if the duration of time $t_2$ becomes substantially greater than duration of time $t_1$, then PCD can turn off the TDMA management mode entirely since any TDMA noise will be short and most likely go unnoticed by the end user.

Figure 4:
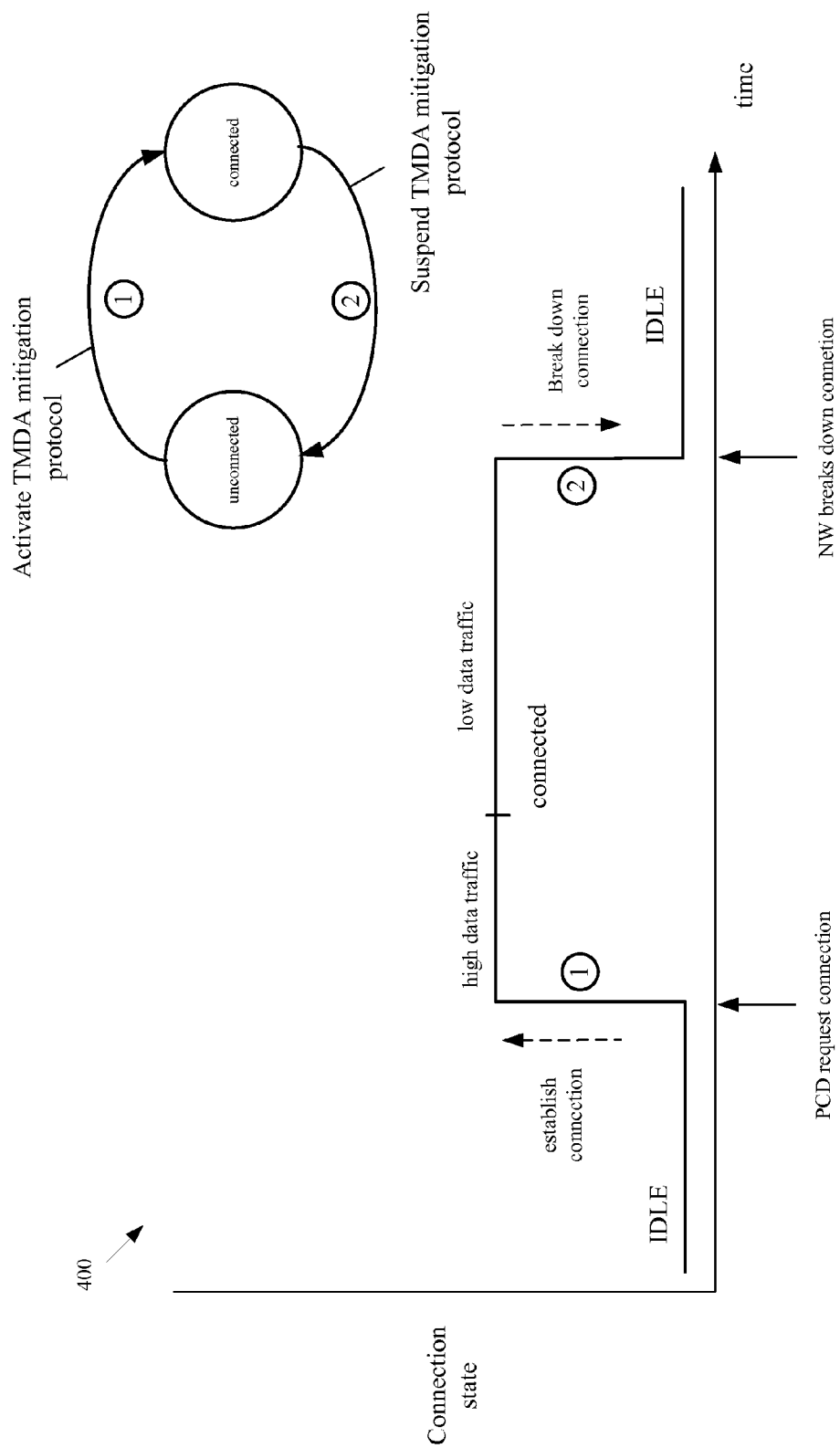
FIG. 4 shows representative connection diagram in accordance with the described embodiments.

For example, FIG. 4 shows a representative connection state diagram 400 of PCD 100 in accordance with the described embodiments. As shown, in the IDLE mode, PCD 100 is not connected with network NW. In this situation, the TDMA management mode can be suspended. However, when PCD 100 generates a connection request that is then sent to network NW, then PCD 100 can at about the same time, instantiate an appropriate TDMA management mode. In some situations, the data traffic pattern during the connected state can also be used to modify the application of the TDMA management mode by adapting to the actual data traffic pattern of PCD 100.

For the remainder of this discussion, a number of embodiments of the PCD are described. It should be noted, however, that the various features and functional modules described herein can be embodied in single configuration of the PCD. Furthermore, the functional modules can be implemented in software, hardware, or firmware but will be discussed in terms of functional blocks for sake of clarity and should not be construed as limiting the scope of the described embodiments.

Figure 5:
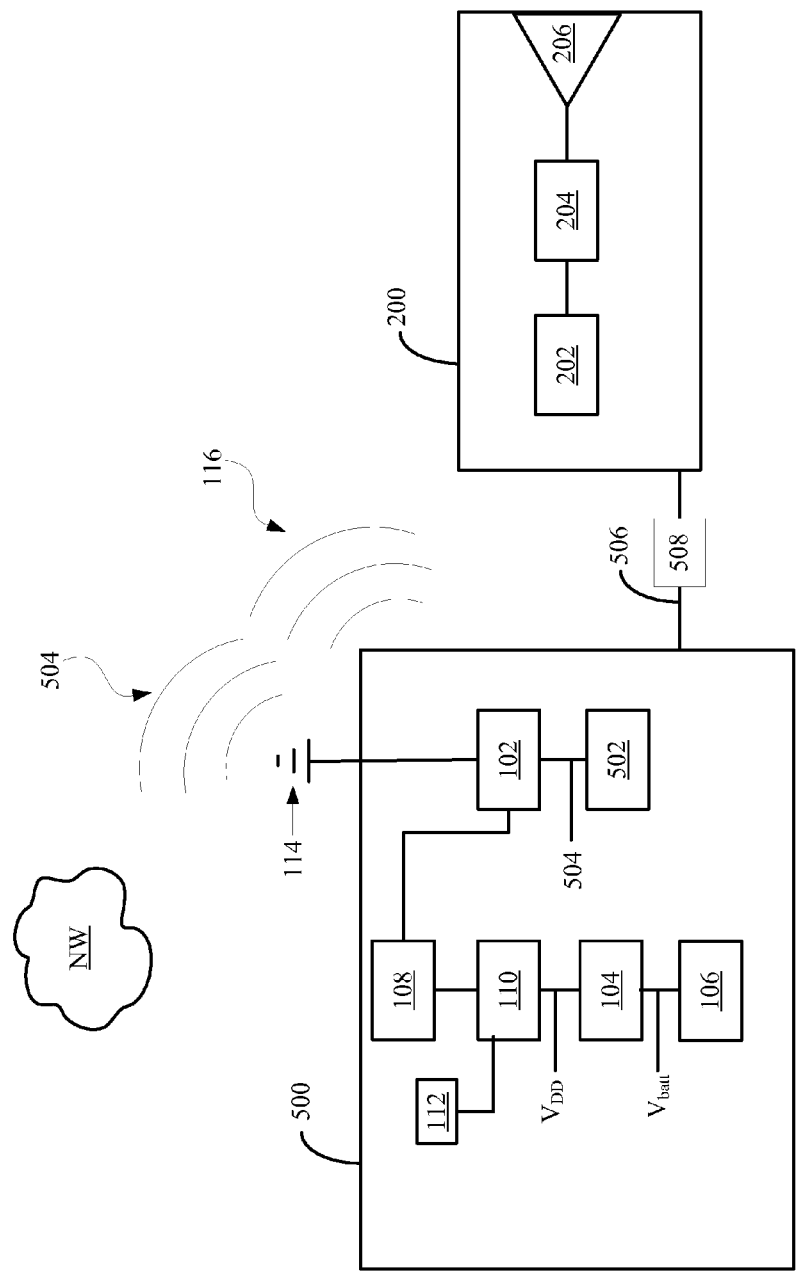
FIG. 5 shows a TDMA noise management module embodied as a TDMA noise cancellation generation module arranged to generate a TDMA noise cancellation signal.

In one embodiment shown in FIG. 5, the TDMA management module is embodied as noise modification generation module 502 arranged to generate TDMA noise modification signal 504 by PCD 500. In one embodiment, TDMA noise modification signal 504 can be broadcast without regards to the presence (if any) of any audio circuits in the vicinity of PCD 500 that may or may not be susceptible to TDMA noise. In such cases, the presumption is that PCD 500 has no particular knowledge of the presence of any such audio circuits and can therefore proactively pre-empt any adverse interference caused by PCD 500 by providing TDMA noise modification signal 504. In one embodiment, TDMA noise modification signal module 502 can be automatically activated whenever PCD 500 enters into a call (or data) active mode in which an active communication channel with the wireless network (NW) is (or anticipated to be) established. In another embodiment, TDMA noise modification signal module 502 can be activated manually. In any case, during an active call, TDMA noise modification module 502 broadcasts TDMA noise modification signal 504 by way of antenna 114. In one embodiment, TDMA noise modification signal 504 can take the form of TDMA noise cancellation signal that destructively interferes with RF based TDMA noise signal 116. In this way, TDMA noise signal 116 can be effectively eliminated (or at least greatly reduced) at audio device 200.

In those embodiments, however, where communication channel 506 can be created (or already exists) between PCD 500 and audio device 200, then information 508 can be exchanged. Information 508 can be used by audio device 200 to notify PCD 500 of certain audio device operating parameters (such as audio gain) that can be used by PCD 500 to modify TDMA noise modification signal 504. For example, when gain G of audio amplifier 204 is high, then PCD 500 can increase the corresponding gain of TDMA noise cancellation signal 504, and vice versa. In this way, the ability to effectively reduce or eliminate TDMA based audible noise can be substantially improved. It should be noted that communication channel 506 can be based upon a wired connection or wireless connection.

Figure 6:
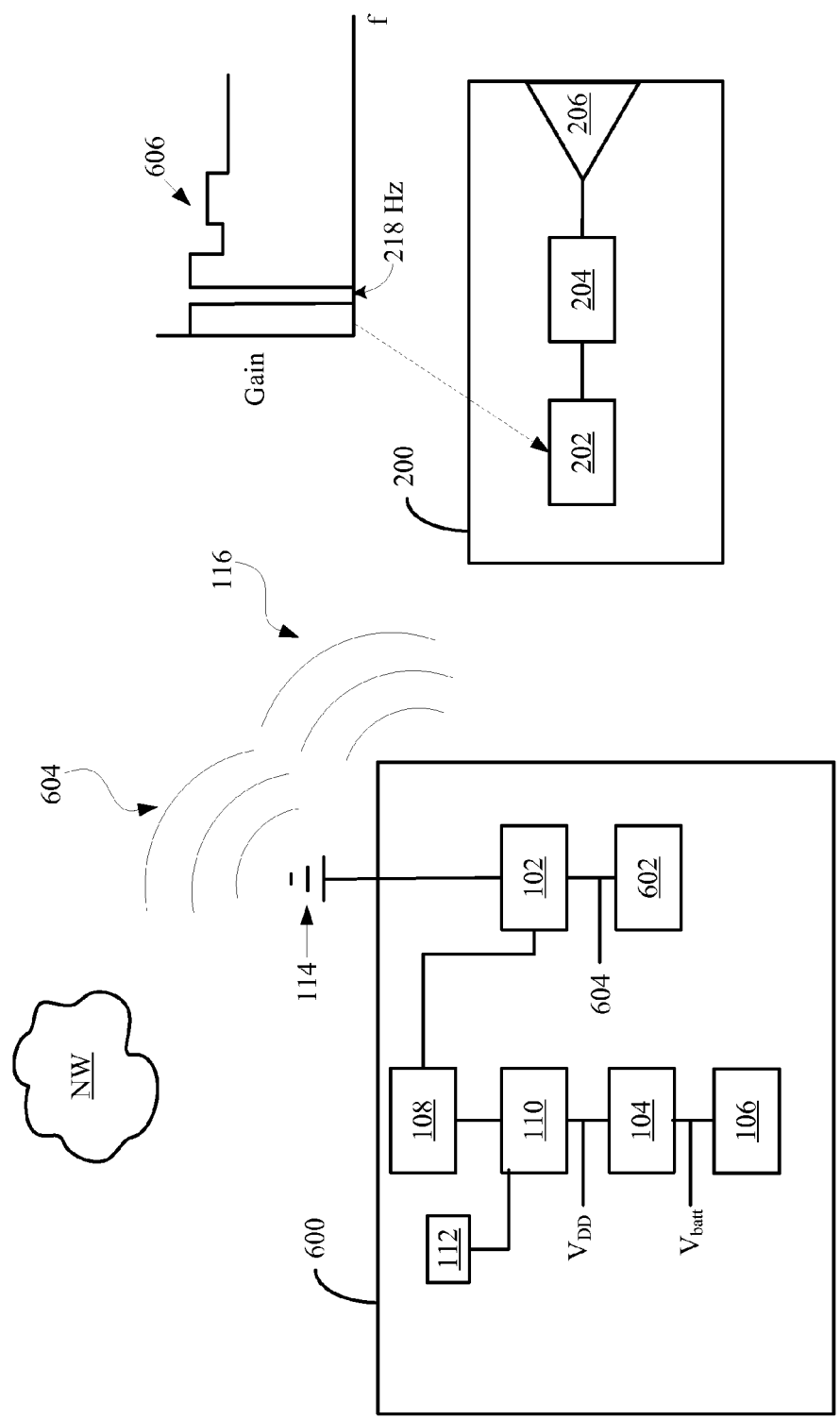
FIG. 6 shows a TDMA noise management module embodied as a TDMA noise notification module arranged to broadcast a notification signal indicating that the portable communication device is actively operating in a TDMA mode.

In another embodiment shown in FIG. 6, the TDMA noise management module is embodied as notification module 602 arranged to broadcast notification signal 604 indicating that PCD 600 is actively operating in a TDMA mode. Notification signal 604 can be received at audio device 200. Audio device 200 can respond to the receiving of notification signal 604 by altering a current operating state of audio device 200. For example, in one embodiment, the receiving of notification signal 604 can cause audio device 200 to replace a current equalizer (EQ) profile with a TDMA resistant EQ profile that can be configured to minimize the effects of TDMA noise on audio signal generated by audio device 200. For example, representative TDMA resistant EQ profile 606 can be configured to include various notch filters corresponding to the TDMA noise components (i.e., 218 Hz, 436 Hz, and so on). However, in order to minimize any information lost from the original audio signal generated by PCD 600 as well as to preserve the overall quality of the audio from PCD 600, TDMA resistant EQ profile 606 can rely upon, for example, a single notch filter corresponding to the fundamental frequency (namely 218 Hz) that represents the greatest proportion of overall energy associated with TDMA noise signal 116. In this way, a minimum amount of information from the original audio signal is lost while maximizing the reduction in TDMA noise.

Figure 7:
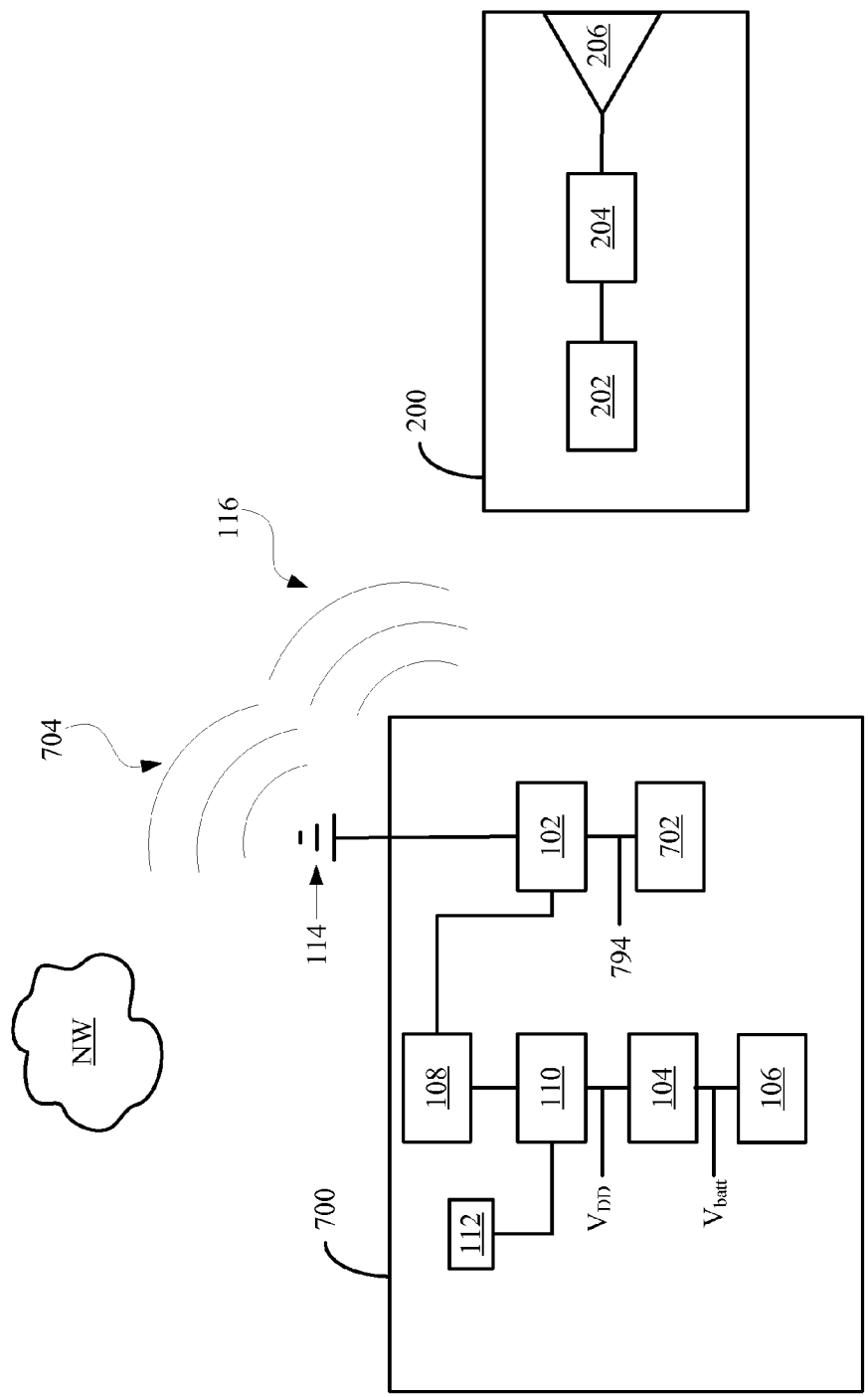
FIG. 7 shows a TDMA noise management module embodied as a frequency shifter module arranged to detect and upshift any frequency components of the original audio signal generated by the portable communication device.
Figure 8B:
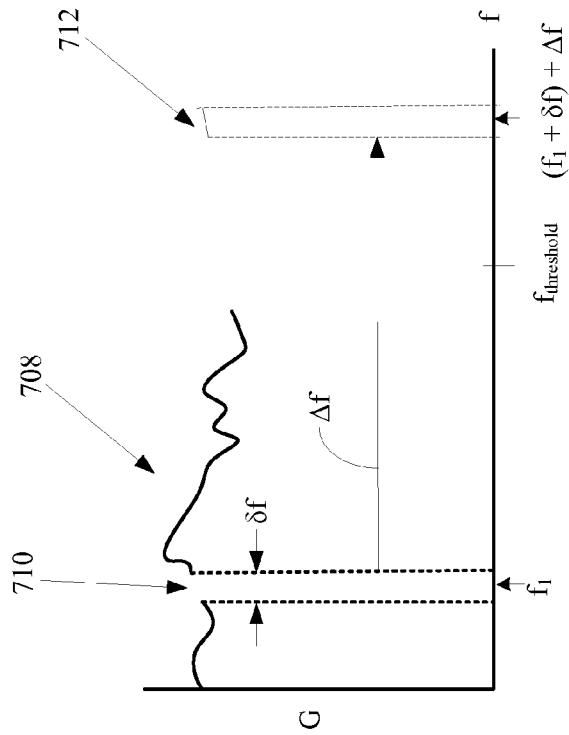
FIGS. 8A and 8B graphically illustrate frequency shifting in accordance with the described embodiments where that portion of original content signal is upshifted.
Figure 8A:
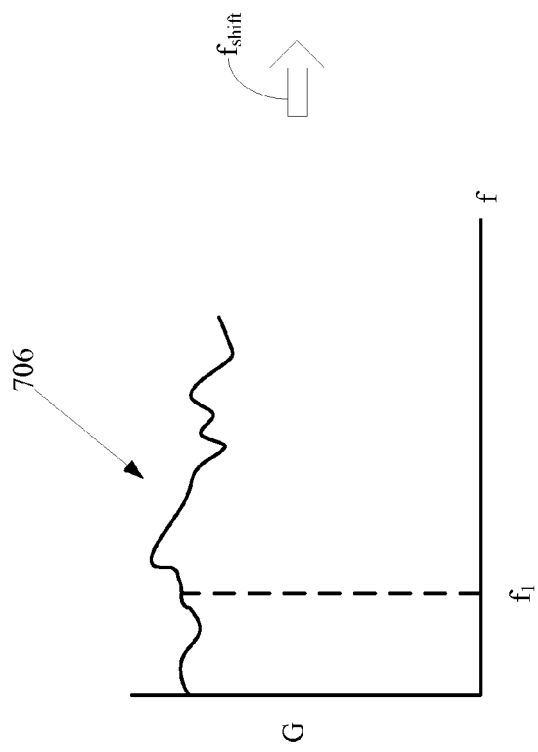

In another embodiment shown in FIG. 7, the TDMA noise management module is embodied as frequency shifter module 702 arranged to detect and upshift any frequency components of the original audio signal generated by PCD 700. The upshifting generally is performed at those frequency components of the original audio signal most closely associated with TDMA noise signal 116. Therefore, PCD 700 can provide frequency shifted signal 704 having those frequency component associated with TDMA noise signal 116 shifted to a range of frequencies not audible to humans. In particular, frequency components of about 218 Hz, 436 Hz, and so on are detected and upshifted by frequency shifter module 702. The frequency components are upshifted to a range of frequencies that are generally inaudible to humans. For example, FIGS. 8A and 8B graphically illustrate frequency shifting in accordance with the described embodiments. In particular, FIG. 8A shows original content signal 706 that represented as a relationship between audio frequency f and gain G. Original content signal 706 that can be generated by PCD 700 in accordance with content provided to or generated by PCD 700. FIG. 8B, however, illustrates the effect shifting function $f_{shift}$ can have on original content signal 706 and in particular on those frequency ranges most closely associated with TDMA noise.

In particular, original content signal 706 can be modified based upon the TDMA noise expected to be emitted by PCD 700 and received at audio device 200 in the form of modified content signal 708. In this example, shifting function $f_{shift}$ acts to shift range of audio frequencies 710 of original content signal 706 having central frequency $f_1$ and a distribution $\Delta f$ about central frequency $f_1$ to upshifted portion 712. Shifting function $f_{shift}$ can, in one embodiment, apply frequency upshift value $\Delta f$ to range of audio frequencies 710 to form upshifted portion 712. In one embodiment, frequency upshift value $\Delta f$ can upshift a range of audio frequencies 510 above frequency threshold $f_{threshold}$ to form upshifted signal 712. In one embodiment, frequency threshold $f_{threshold}$ can be above an upper frequency limit beyond which any audio is essentially inaudible to most humans. In another embodiment, shifting function $f_{shift}$ can be based upon a hearing aid profile in those cases where audio device 200 is related to or otherwise used in conjunction with a hearing aid. In those situations, shifting function $f_{shift}$ can be dependent upon the characteristics of an end user's particular hearing impairment. It should be noted that in some embodiments, content signal 706 can be reconstituted from modified content signal 708 and an inverse frequency shift operation performed on upshifted portion 712.

For example, when audio device 200 is a hearing aid having a hearing aid profile, the upshifting can be in accordance with the associated hearing aid profile. For example, if the end user of the hearing aid has an age related high frequency deficit, then frequency shift module 702 can upshift the frequency components to the range of frequencies not well perceived (if at all) by the end user. In any case, in one embodiment, any information included in the audio corresponding to the up shifted frequencies can be recovered if desired. By preferentially upshifting selected frequency components of the original audio signal, any noise components received at audio device 200 in the range of the frequencies upshifted are presumed to be TDMA noise and be processed accordingly. It should be noted, however, that in this particular embodiment, PCD 700 must be capable of notifying audio device 200 that PCD 700 is operating in the frequency shifting mode.

Figure 9A:
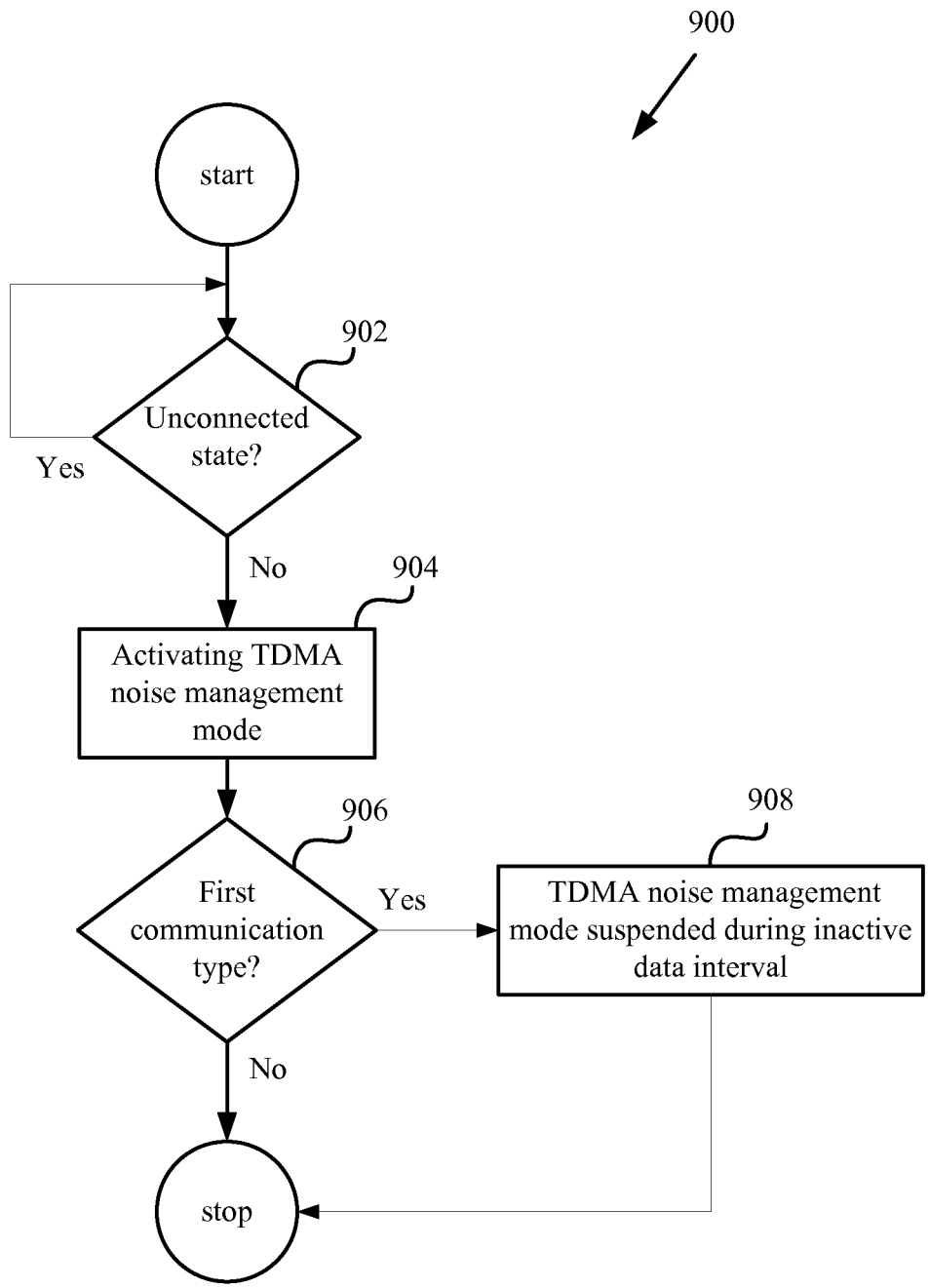
FIG. 9A shows a flowchart describing a process for activating a TDMA noise management mode in accordance with a connection state of a portable communication device.

FIG. 9A shows a flowchart detailing process 900 performed by a portable communication device arranged to communicate with a wireless network. Process 900 can be carried out by determining a connection state of the portable communication device in relation to a wireless network at 902. At 902, when the connection state is determined to be connected, then the portable communication device activates a TDMA noise management mode. When portable communication device determines that a communication type between the portable communication device and the network is a first communication type, then the TDMA noise management mode is suspended during a period of data inactivity and process 900 ends. In one embodiment, the first communication type corresponds to a low data traffic pattern between the portable communication device and the NW.

Figure 9B:
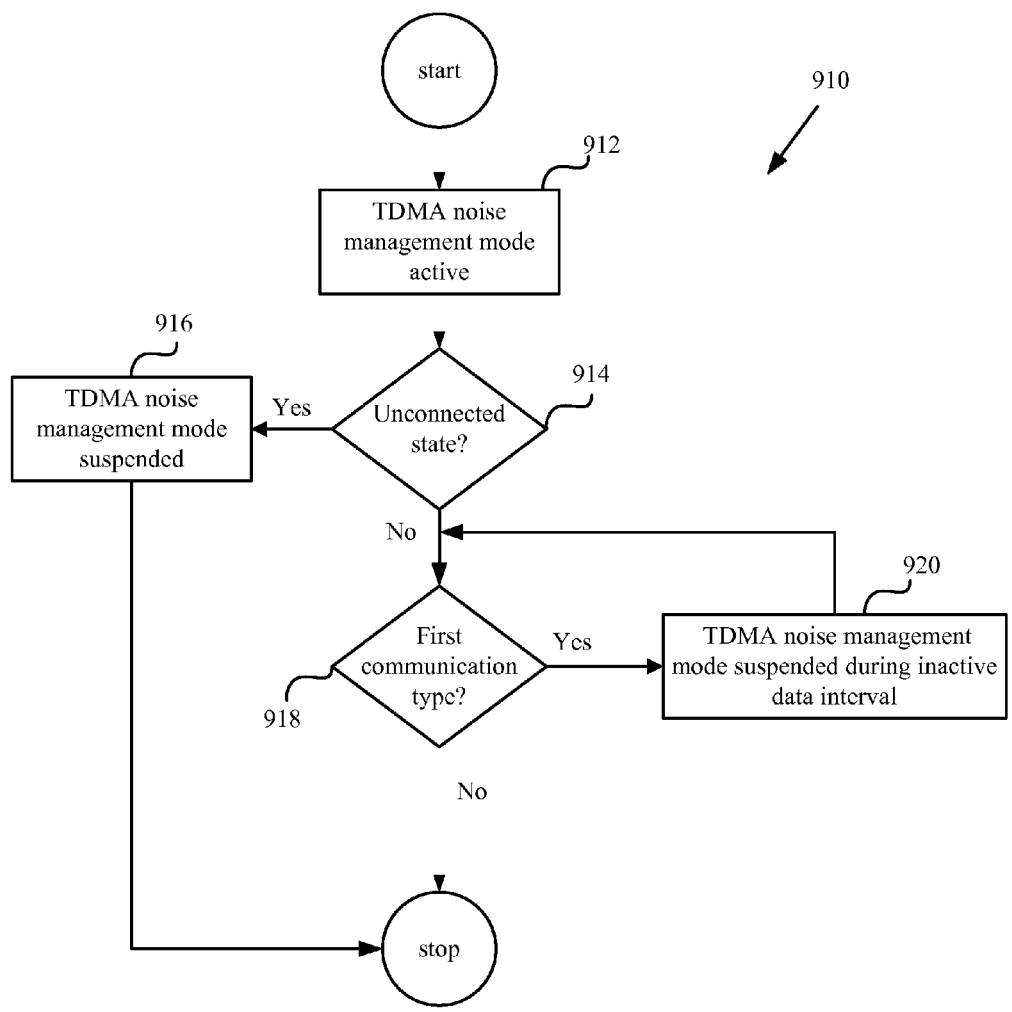
FIG. 9B shows a flowchart describing a process for suspending a TDMA noise management mode in accordance with a connection state of a portable communication device.

FIG. 9B shows a flowchart detailing process 910 in accordance with the described embodiments. In particular process 910 can describe a process for use of a TDMA noise management mode based upon a connection state of a portable communication device. More specifically, process 900 can begin at 912 by activating a TDMA noise management mode by the portable communication device. When it is determined at 914 that the connection state of the portable communication device and the wireless network is unconnected, then at 916, the TDMA noise management mode is suspended and process 910 ends. Otherwise, at 918 a determination is made if the communication type between the portable communication device and the wireless network is a first communication type. If the communication type is determined to a first communication type, then at 920, the TDMA noise management mode is suspended during inactive data intervals and process 910 ends. In one embodiment, the first communication type can correspond to a low data traffic pattern.

Figure 10:
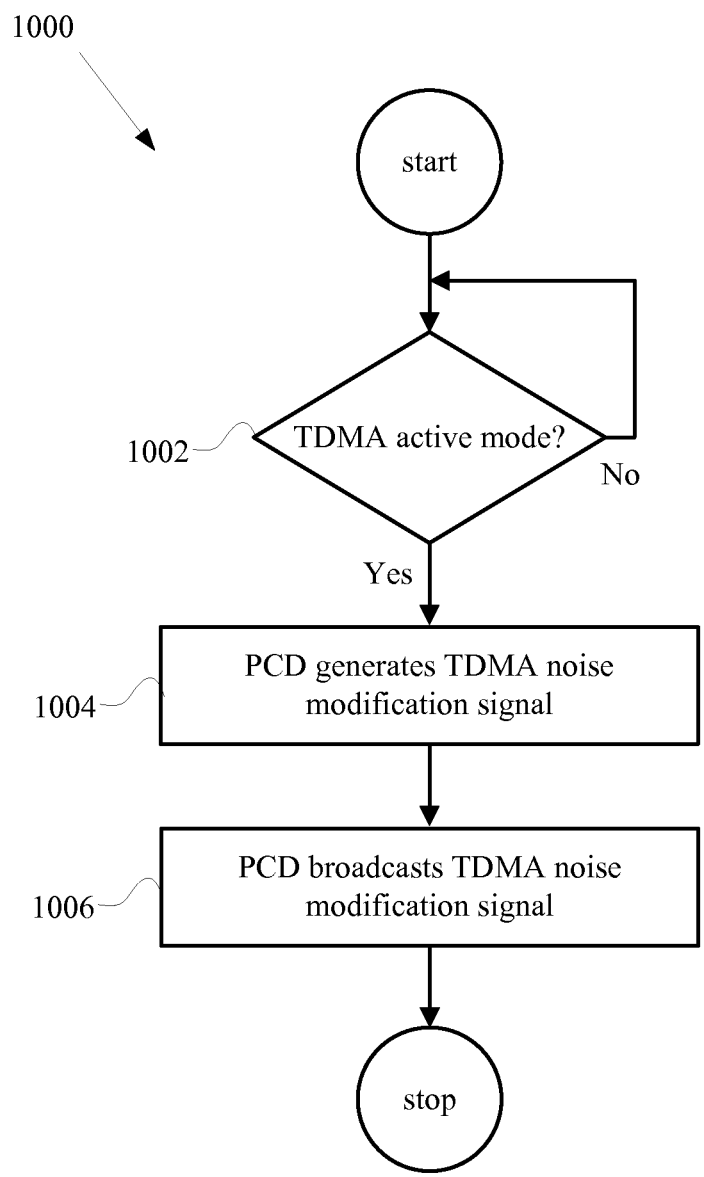
FIG. 10 shows another flow chart describing a process for applying a TDMA noise management mode in accordance with the described embodiments.

FIG. 10 shows a flowchart detailing process 1000 in accordance with the described embodiments. Process 1000 can begin at 1002 when a determination that portable communication device is in an active TDMA mode. By active mode it is meant that PCD has instantiated an active communication channel with a network (NW). The active communication channel can be associated with either a voice call or a data transmission (either upload or download). For example, in some cases, an application such as email can periodically download data from the network in the form of email. In order to download the data, an active communication channel must be established between the PCD and the NW. The active communication channel can result in generation of TDMA noise in spite of the fact that no voice call is being conducted. Therefore, periodic TDMA noise generated by the PCD can manifest itself in audible noise at a speaker associated with an audio device susceptible to RF energy corresponding to the TDMA noise.

Therefore, when at 1002 it is determined that the PCD is in active TDMA mode, at 1004, the PCD generates a TDMA noise modification signal. The TDMA noise modification signal can then be broadcast the PCD at 1006. In one embodiment, the TDMA noise modification signal can take the form of, for example, a TDMA noise cancellation signal that can be an inverse of the TDMA noise signal generated by the PCD. In this case, the TDMA noise cancellation signal can then be broadcast by the PCD at 1006. The broadcasted TDMA noise cancellation signal can then destructively interfere with any TDMA noise signal emitted by the PCD having the effect of substantially reducing or eliminating the TDMA noise coupling of any susceptible audio circuit.

Figure 11:
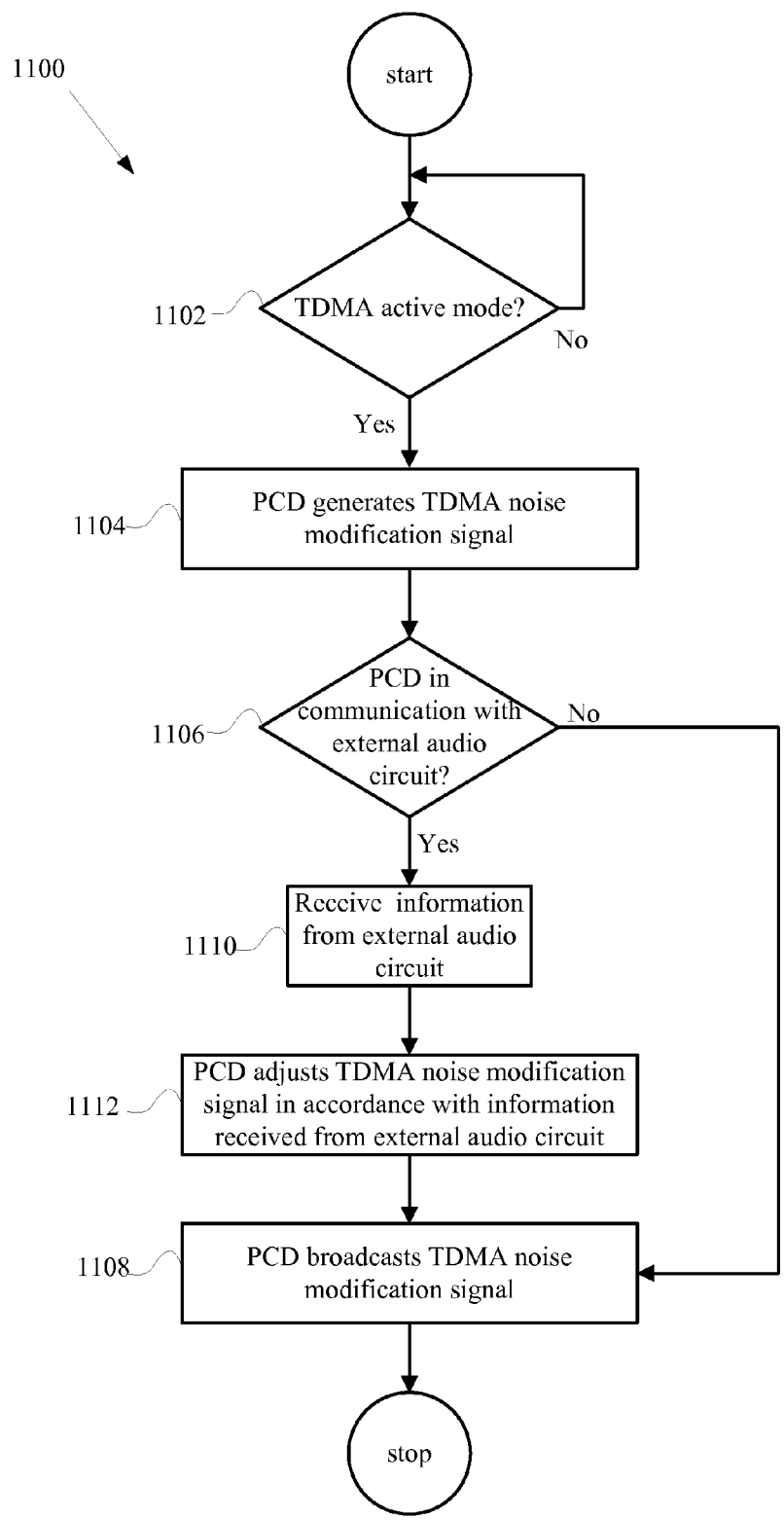
FIG. 11 shows another flow chart describing a process for applying a TDMA noise management mode in accordance with the described embodiments.

FIG. 11 shows a flowchart detailing process 1100 in accordance with another embodiment of process 1000 in which the PCD and an external audio circuit can exchange information. This situation is typically associated with the audio circuit being connected (either wirelessly or wired) to the PCD. For example, the audio circuit can take the form of speakers, head phones, ear buds or even a hearing aid in those cases where the hearing aid and PCD are electronically coupled to each other. In any case, process 1100 can begin at 1102 by determining if the PCD is in active TDMA mode in which case the PCD generates the TDMA noise cancellation signal. At 1106, if the PCD is not in communication with an external audio circuit, then the PCD broadcasts the TDMA noise cancellation signal at 1108. However, if at 1106 it is determined that the PCD and the audio circuit are in communication with each other, and then at 1110, information from the audio circuit is received at the PCD. The information can include current operating parameters of the audio circuit. Such operating parameters can include, for example, a current gain G of the audio circuit. At 1112, after receipt of the information from the audio circuit, the PCD can modify the TDMA noise cancellation signal in accordance with the received information.

For example, if the received information includes gain G of the audio circuit, then the PCD can modify the TDMA noise cancellation signal in accordance with the gain G. Once the PCD has adjusted the TDMA noise cancellation signal in accordance with the received information, then at 1108, the PCD broadcasts the TDMA noise cancellation signal. In another embodiment, the audio circuit can update a current EQ profile to one associated with reducing or eliminating TDMA noise. For example, the updated EQ profile can correspond to a TDMA resistant EQ profile having at least one notch filter at a frequency corresponding to a fundamental component of TDMA noise, namely 218 Hz or thereabout.

Figure 12:
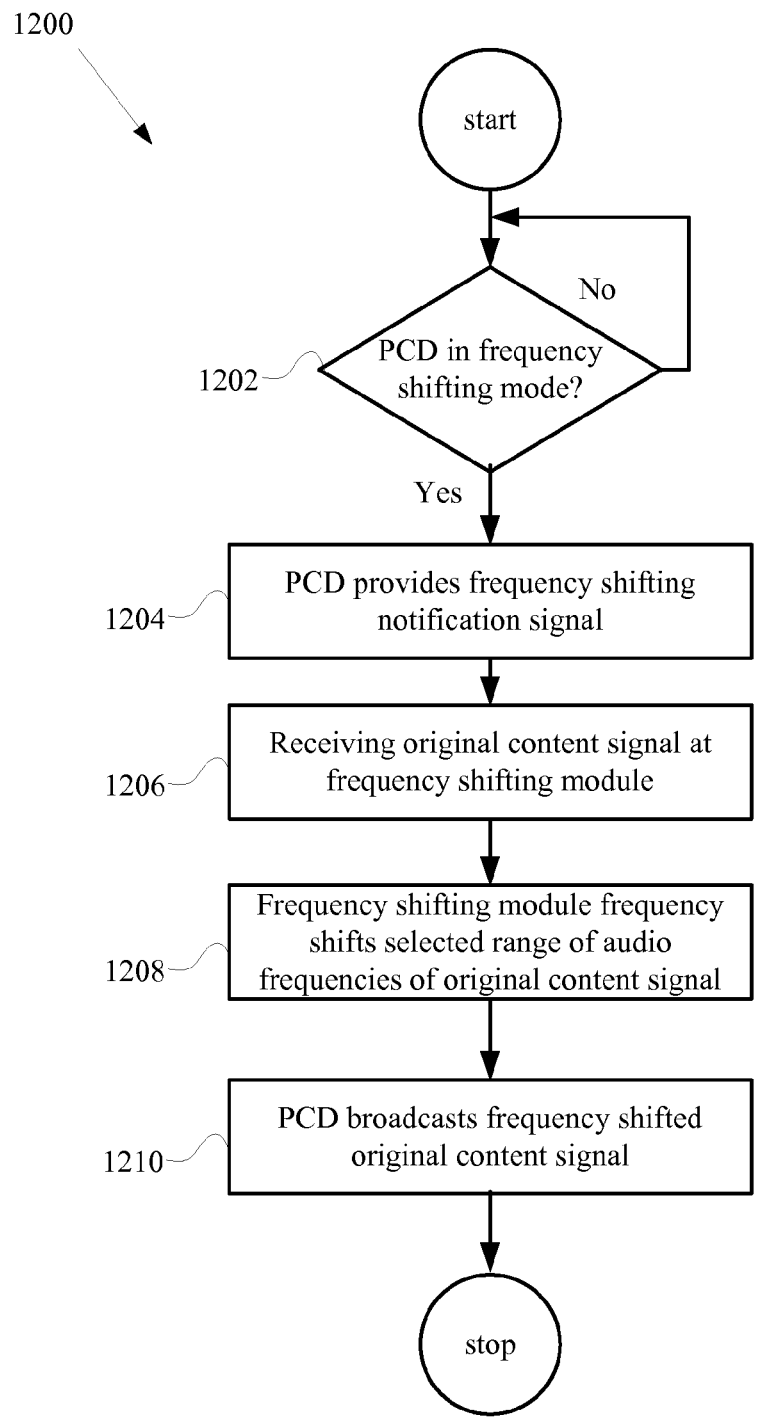
FIG. 12 shows still another flow chart describing a process for applying a TDMA noise management mode in accordance with the described embodiments.

FIG. 12 shows a flowchart detailing process 1200 in accordance with the described embodiments. Process 1200 can be performed by an audio device in communication with the PCD. In one embodiment, the audio device can be considered component as part of a system that includes both the PCD and the audio circuit. For example, the PCD and audio circuit can form a system having as components the PCD as an audio processing component in communication with an audio presenting component in the form of the audio circuit. A hearing assistance system such as a hearing aid supported by a portable communication device such as a cell phone can be one example of such a system. In any case, process 1200 can begin at 1202 by determining if the PCD is in a frequency shifting mode. When it is determined that the PCD is in the frequency shifting mode, then at 1204, the PCD notifies the audio device that the PCD is applying a shifting function to any audio based RF transmission. At 1206 an original content signal is received and at 1208, the PCD applies the shifting function to the original content signal. At 1210, the frequency shifted original content signal is then broadcast by the PCD. In one embodiment, the shifting function can shift a range of frequencies distributed about a central frequency above a threshold frequency beyond which most humans cannot audibly perceive. In another embodiment, the PCD can shift selected frequencies and/or frequency ranges in accordance with specific frequency shifting parameters. The specific frequency shifting parameters can be associated with, for example, a hearing aid profile in those cases with the audio circuit is associated with an end user's hearing aid or other hearing assistance device.

Figure 13:
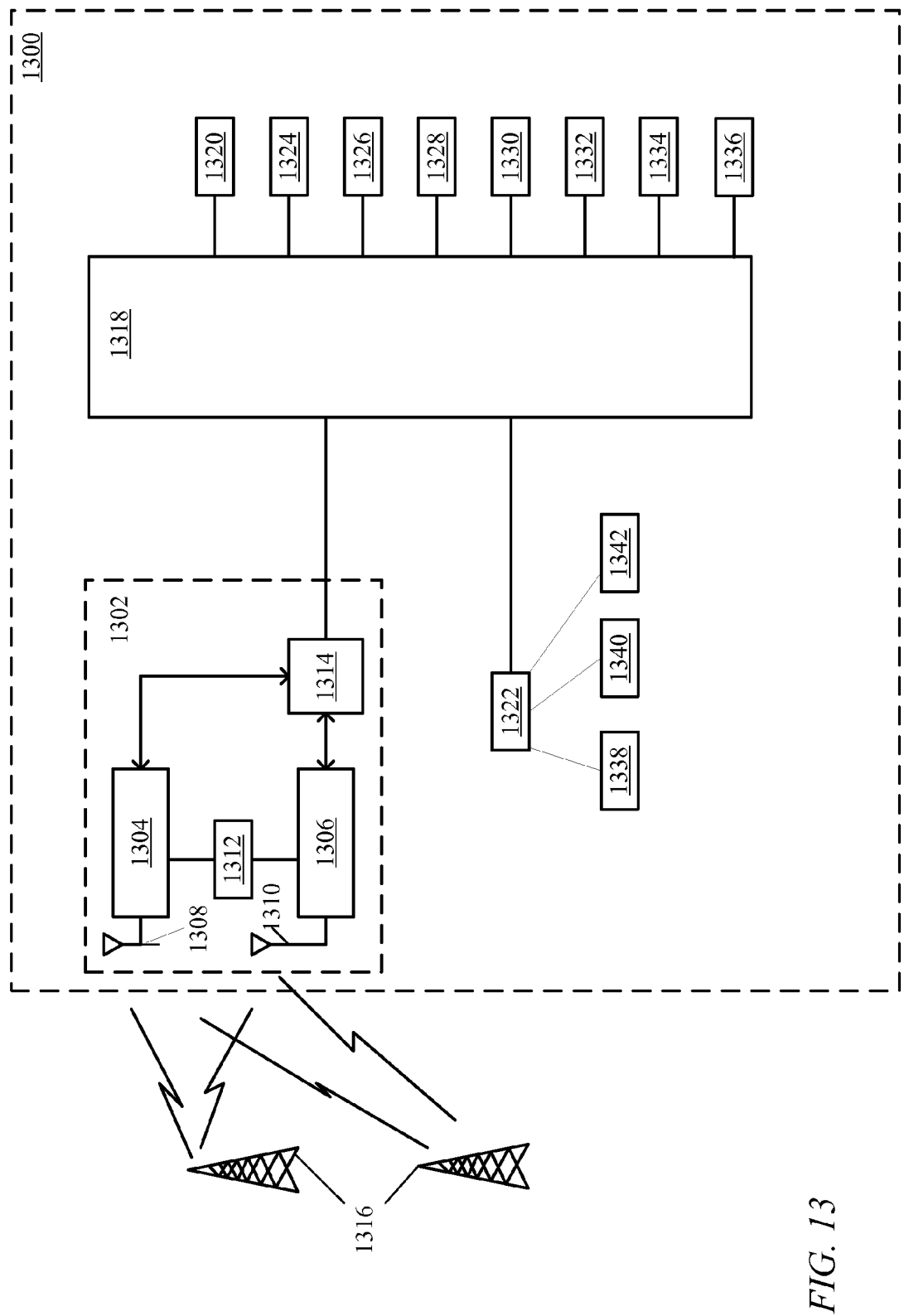
FIG. 13 shows an example of a portable communication device in accordance with the described embodiments.

While the above can be implemented on a variety of mobile or wireless devices, an example of one mobile device is outlined below with respect to FIG. 13. PCD 1300 is preferably a two-way wireless communication device having at least voice and data communication capabilities. PCD 1300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples. Where PCD 1300 is enabled for two-way communication, it will incorporate a communication subsystem 1302, including a receiver 1304 and a transmitter 1306, as well as associated components such as one or more, preferably embedded or internal, antenna elements 1308 and 1310, local oscillators (LOs) 1312, and a processing module such as a digital signal processor (DSP) 1314. As will be apparent to those skilled in the field of communications, the particular design of the communication subsystem 1302 will be dependent upon the communication network in which the device is intended to operate.

When required network registration or activation procedures have been completed, PCD 1300 may send and receive communication signals over the network 1316. Signals received by antenna 1308 through communication network 1316 are input to receiver 1304, which may perform such common receiver functions as signal amplification, frequency down conversion, filtering, channel selection and the like, and in the example system shown in FIG. 13, analog to digital (A/D) conversion. A/D conversion of a received signal allows more complex communication functions such as demodulation and decoding to be performed in the DSP 1314. In a similar manner, signals to be transmitted are processed, including modulation and encoding for example, by DSP 1314 and input to transmitter 1306 for digital to analog conversion, frequency up conversion, filtering, amplification and transmission over the communication network 1316 via antenna 1310. DSP 1314 not only processes communication signals, but also provides for receiver and transmitter control. For example, the gains applied to communication signals in receiver 1304 and transmitter 1306 may be adaptively controlled through automatic gain control algorithms implemented in DSP 1314.

PCD 1300 includes a microprocessor 1318, which controls the overall operation of the device. Communication functions, including at least data communications, are performed through communication subsystem 1302. Microprocessor 1318 also interacts with further device subsystems such as the display 1320, flash memory 1322, random access memory (RAM) 1324, auxiliary input/output (I/O) subsystems 1326, serial port 1328, keyboard 1330, speaker 1332, microphone 1034, and any other device subsystems generally designated as 1336. Notably, some subsystems, such as keyboard 1330 and display 1320, for example, may be used for both communication-related functions, such as entering a text message for transmission over a communication network, and device-resident functions such as a calculator or task list.

Operating system software used by the microprocessor 1318 is preferably stored in a persistent store such as flash memory 1322, which may instead be a read-only memory (ROM) or similar storage element (not shown). Those skilled in the art will appreciate that the operating system, specific device applications, or parts thereof, may be temporarily loaded into a volatile memory such as RAM 1324. Received communication signals may also be stored in RAM 1324. Further, a unique identifier is also preferably stored in read-only memory. As shown, flash memory 1322 can be segregated into different areas for both computer programs and program data storage. These different storage types indicate that each program can allocate a portion of flash memory 1322 for their own data storage requirements. For example, portion 1038 of flash memory 1322 can be allocated to store instructions operable to implement a frequency upshifter, whereas portion 1340 and 1342 can store instructions operable to provide TDMA noise cancellation signal and an EQ profile. Microprocessor 1318, in addition to its operating system functions, preferably enables execution of software applications on the mobile device.

In a data communication mode, a received signal such as a text message or web page download will be processed by the communication subsystem 1302 and input to the microprocessor 1318, which preferably further processes the received signal for output to the display 1320, or alternatively to an auxiliary I/O device. A communication network through the communication subsystem 1302.

For voice communications, overall operation of PCD 1300 is similar, except that received signals would preferably be output to a speaker 1340 and signals for transmission would be generated by a microphone. Alternative voice or audio I/O subsystems, such as a voice message recording subsystem, may also be implemented on PCD 1300. Although voice or audio signal output is preferably accomplished primarily through the speaker 1340, display 1320 may also be used to provide an indication of the identity of a calling party, the duration of a voice call, or other voice call related information for example.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the presently described embodiments are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method performed by a portable communication device that is time division multiple access (TDMA) enabled, the method comprising:
    determining whether the portable communication device is in a connected state with a wireless network;
    activating a TDMA noise management mode in response to determining that the portable communication device is in the connected state with the wireless network;
    while the TDMA noise management mode is activated:
        generating a TDMA noise modification signal associated with a TDMA noise signal emitted by the portable communication device, the TDMA noise modification signal configured to reduce an electromagnetic coupling between the TDMA noise signal and an audio circuit that is external to the portable communication device, and
        broadcasting the TDMA noise modification signal separately from emission of the TDMA noise signal; and
    suspending the TDMA noise management mode during a period of data inactivity between the portable communication device and the wireless network.

2. The method as recited in claim 1, further comprising deactivating the TDMA noise management mode in response to determining that the portable communication device is in an unconnected state with respect to the wireless network.

3. The method as recited in claim 1, wherein the portable communication device suspends the TDMA noise management mode in response to determining the period of data inactivity exceeds a threshold value.

4. The method as recited in claim 1, wherein the TDMA noise modification signal is a TDMA noise cancellation signal configured to destructively interfere with the TDMA noise signal such that electromagnetic interaction between the TDMA noise signal and the audio circuit is substantially reduced.

5. The method as recited in claim 4, further comprising:
receiving information from an audio device associated with the audio circuit; and
adjusting the TDMA noise cancellation signal based on the information received from the audio device.

6. The method as recited in claim 5, wherein the information received from the audio device includes a gain value of the audio circuit, and adjusting the TDMA noise cancellation signal comprises adjusting a gain of the TDMA noise cancellation signal in accordance with the gain value of the audio circuit.

7. The method as recited in claim 4, wherein the audio circuit is electrically coupled to an audio output device, and destructive interference of the TDMA noise cancellation signal with the TDMA noise signal causes a reduction in TDMA-based audible noise at the audio output device.

8. A portable communication device, comprising:
a radio frequency (RF) circuit that is time division multiple access (TDMA) enabled, wherein during a portion of an active call by the portable communication device, the RF circuit generates a TDMA noise signal that is emitted by the portable communication device;
a TDMA noise modification signal generator in communication with the RF circuit and configured to generate a TDMA noise modification signal during the portion of the active call; and
an RF antenna electrically coupled to the circuit and configured to broadcast the TDMA noise modification signal separately from emission of the TDMA noise signal during the portion of the active call, wherein the TDMA noise modification signal is configured to reduce an electromagnetic coupling between the TDMA noise signal emitted by the portable communication device and an audio circuit that is external to the portable communication device.

9. The portable communication device as recited in claim 8, wherein the TDMA noise modification signal is a TDMA noise cancellation signal configured to destructively interfere with the TDMA noise signal such that electromagnetic interaction between the TDMA noise signal and the audio circuit is substantially reduced.

10. The portable communication device as recited in claim 9, further comprising:
an interface configured to receive information from an audio device associated with the audio circuit; and
a processor in communication with the interface and the TDMA noise modification signal generator, the processor configured to cause the TDMA noise modification signal generator to adjust the TDMA noise cancellation signal based on the information received from the audio device.

11. The portable communication device as recited in claim 10, wherein the information received from the audio device includes a gain value of the audio circuit, and the TDMA noise modification signal generator adjusts the TDMA noise cancellation signal by adjusting a gain of the TDMA noise cancellation signal in accordance with the gain value of the audio circuit.

12. The portable communication device as recited in claim 9, wherein the audio circuit is electrically coupled to an audio output device, and destructive interference of the TDMA noise cancellation signal with the TDMA noise signal causes a reduction in TDMA-based audible noise at the audio output device.

13. A non-transitory computer readable medium configured to store instructions that, when executed by a processor of a portable communication device operable to emit a time division multiple access (TDMA) noise signal, cause the portable communication device to perform the following:
determining whether the portable communication device is in a connected state with a wireless network;
activating a TDMA noise management mode in response to determining the portable communication device is in the connected state with the wireless network;
while the TDMA noise management mode is activated:
generating a TDMA noise modification signal associated with the TDMA noise signal, the TDMA noise modification signal configured to reduce radio frequency (RF) interference, at an audio circuit external to the portable communication device, when the TDMA noise signal is emitted by the portable communication device;
broadcasting the TDMA noise modification signal separately from the TDMA noise signal;
determining whether a suspension of the TDMA noise management mode is required based on a data traffic activity between the portable communication device and the wireless network; and
suspending the TDMA noise management mode during a period of data inactivity in response to determining that suspension of the TDMA noise management mode is required.

14. The non-transitory computer readable medium as recited in claim 13, wherein the instructions, when executed by the processor, further cause the portable communication device to perform the following:
suspending the TDMA noise management mode when the portable communication device is in an unconnected state with respect to the wireless network.

15. The non-transitory computer readable medium as recited in claim 13, wherein the instructions, when executed by the processor, further cause the portable communication device to perform the following:
prior to determining whether to suspend the TDMA noise management mode:
determining a first time interval that is a duration of a data transfer event between the portable communication device and the wireless network;
determining a second time interval between successive data transfer events between the portable communication device and the wireless network; and
characterizing the data traffic activity as having a first type of pattern or as having a second type of pattern different from the first type of pattern, the characterization based on a relationship between the first time interval and the second time interval.

16. The non-transitory computer readable medium as recited in claim 15, wherein determining whether a suspension of the TDMA noise management mode is required is based on whether the data traffic activity is characterized as a first type of pattern.

17. The non-transitory computer readable medium as recited in claim 15, wherein characterizing the data traffic activity comprises characterizing the data traffic activity as the first type of pattern when the second time interval is substantially greater than the first time interval.

18. A portable communication device, comprising:
a wireless interface that is time division multiple access (TDMA) enabled;
a processor coupled to the wireless interface;
a storage device coupled to the processor and configured to store instructions, that when executed by the processor, cause the portable communication device to perform the following:

exchanging data with a wireless network;
activating a TDMA noise management mode;
while the TDMA noise management mode is activated:
- generating a TDMA noise modification signal associated with a TDMA noise signal, the TDMA noise modification signal configured to reduce radio frequency (RF) interference, at an audio circuit external to the portable communication device, when the TDMA noise signal is emitted by the portable communication device;
- broadcasting the TDMA noise modification signal separately from emission of the TDMA noise signal;
- determining whether to suspend the TDMA noise management mode based on a data traffic activity between the portable communication device and the wireless network; and
- suspending the TDMA noise management mode when required based on the data traffic activity between the portable communication device and the wireless network.

19. The portable communication device as recited in claim 18, wherein the data traffic activity includes one or more periods of data inactivity, and determining whether to suspend the TDMA noise management mode is based on the one or more periods of data inactivity.

20. The portable communication device as recited in claim 18, wherein the instructions, when executed by the processor, further cause the portable communication device to perform the following:
- deactivating the TDMA noise management mode when the data traffic activity includes a period of data inactivity that exceeds a threshold value.

21. The portable communication device as recited in claim 18, wherein the audio circuit is electrically coupled to an audio output device, and wherein broadcasting the TDMA noise modification signal causes a reduction or an elimination of an audible noise at the audio output device, the audible noise caused by the TDMA noise signal emitted by the portable communication device.

22. The portable communication device as recited in claim 18, wherein the instructions, when executed by the processor, further cause the portable communication device to perform the following:
- characterizing the data traffic activity as having a first type of pattern or having a second type of pattern different from the first type of pattern, the characterization based on a relationship between a period of data activity in data traffic activity and a period of data inactivity in data traffic activity,
- wherein determining whether a suspension of the TDMA noise management mode is required is based on whether the data traffic activity is characterized as having the first type of pattern.

23. The portable communication device as recited in claim 18, wherein the portable communication device broadcasts the TDMA noise modification signal via an interface used to exchange data with the wireless network.

* * * * *

UNITED STATES PATENT AND TRADEMARK OFFICE
CERTIFICATE OF CORRECTION

PATENT NO. : 8,837,749 B2  Page 1 of 1
APPLICATION NO. : 13/044401
DATED : September 16, 2014
INVENTOR(S) : Edwin W. Foo It is certified that error appears in the above-identified patent and that said Letters Patent is hereby corrected as shown below:

In the Claims:

Column 15, line 27 (Claim 8, line 11): "the circuit" should read --the RF circuit--.

Signed and Sealed this
Sixteenth Day of December, 2014

Michelle K. Lee
*Deputy Director of the United States Patent and Trademark Office*